(12) United States Patent
Nagashima et al.

(10) Patent No.: US 10,590,024 B2
(45) Date of Patent: Mar. 17, 2020

(54) PRODUCTION METHOD FOR MULTICORE OPTICAL FIBER

(71) Applicant: SUMITOMO ELECTRIC INDUSTRIES, LTD., Osaka-shi, Osaka (JP)

(72) Inventors: Takuji Nagashima, Yokohama (JP); Tetsuya Nakanishi, Yokohama (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 269 days.

(21) Appl. No.: 15/864,028

(22) Filed: Jan. 8, 2018

(65) Prior Publication Data

US 2018/0244556 A1    Aug. 30, 2018

(30) Foreign Application Priority Data

Feb. 28, 2017   (JP) .................. 2017-037384

(51) Int. Cl.
  *C03B 37/012*   (2006.01)
  *G02B 6/02*    (2006.01)
  *C03B 37/027*   (2006.01)

(52) U.S. Cl.
  CPC .... *C03B 37/01222* (2013.01); *C03B 37/0124* (2013.01); *C03B 37/0126* (2013.01); *C03B 37/01231* (2013.01); *C03B 37/01251* (2013.01); *C03B 37/02736* (2013.01); *C03B 37/02745* (2013.01); *C03B 37/02772* (2013.01); *G02B 6/02042* (2013.01); *C03B 2203/34* (2013.01); *C03B 2205/07* (2013.01); 
(Continued)

(58) Field of Classification Search
  CPC ........ C03B 37/01222; C03B 37/01251; C03B 37/02772; C03B 2203/34; C03B 2203/47; C03B 2205/47
  See application file for complete search history.

(56) References Cited

U.S. PATENT DOCUMENTS 4,561,871 A * 12/1985 Berkey ............. C03B 37/01222
                                                65/412
9,321,670 B2    4/2016 Okada
(Continued)

FOREIGN PATENT DOCUMENTS

JP         2006-160528 A    6/2006

*Primary Examiner* — Jason L Lazorcik
(74) *Attorney, Agent, or Firm* — Drinker Biddle & Reath LLP

(57) ABSTRACT

There is provided a method for producing a multicore optical fiber while reducing the mass of a glass block to be connected to a common cladding tube. A production method for a multicore optical fiber includes in order, a preform forming step of forming a common cladding tube having a plurality of holes extending between a first end and a second end, an insertion step of inserting core rods in the holes in a state in which end portions of the core rods are recessed from the first end, a heat shrinkage step of reducing a diameter of the first end by heating, a sealing step of sealing the holes by connecting a glass block to the first end, and a drawing step of depressurizing insides of the holes from the second end and performing spinning from the first end while combining the common cladding tube and the core rods.

8 Claims, 5 Drawing Sheets

(52) U.S. Cl.
CPC ...... *C03B 2205/08* (2013.01); *C03B 2205/45* (2013.01); *C03B 2205/46* (2013.01); *C03B 2205/47* (2013.01)

(56) References Cited

U.S. PATENT DOCUMENTS

| | | | |
|---|---|---|---|
| 2004/0107735 A1* | 6/2004 | Fletcher, III | C03B 37/01211 65/412 |
| 2007/0245773 A1* | 10/2007 | Peekhaus | C03B 37/01205 65/393 |
| 2013/0061637 A1* | 3/2013 | Okada | C03B 37/01211 65/435 |
| 2015/0274577 A1* | 10/2015 | Nakanishi | C03B 37/01222 65/378 |
| 2016/0229733 A1* | 8/2016 | Nakanishi | C03B 37/01222 |
| 2018/0244557 A1* | 8/2018 | Nagashima | C03B 37/0126 |

* cited by examiner

PRODUCTION METHOD FOR MULTICORE OPTICAL FIBER

BACKGROUND OF THE INVENTION

Field of the Invention

The present invention relates to a production method for a multicore optical fiber.

Description of the Related Art

Recently, the amount of data transmitted through optical fibers by optical communication has been increasing. One reason for this is that the amount of communication data using mobile phones has increased and this has increased the amount of communication data between base stations and between base stations and telecommunication carriers. In television broadcasting, for example, so-called 4 K broadcasting and 8 K broadcasting have been partly started or are scheduled, and the amount of communication data has been increased by distribution of broadcasting through cable television.

To cope with the increase in communication data amount, multicore optical fibers in each of which a single optical fiber includes a plurality of cores have been actively studied and reported. In a multicore optical fiber, a plurality of cores are disposed in a common cladding made of glass in an extending direction (axial direction) of the optical fiber. Since an uncoupled-core multicore optical fiber allows communication data to be transmitted and received through cores, the amount of communication data can be increased in accordance of the number of cores. In a coupled-core multicore optical fiber, communication data transfers between cores. However, since the communication data can be separated by signal processing on the receiving side, the amount of communication data can be increased in accordance with the number of cores.

In a known production method for a multicore optical fiber, after core rods made of quartz glass are inserted in a plurality of holes of a common cladding tube made of quartz glass, drawing is performed while combining the common cladding tube and the core rods. In this method, there is known a technique of sealing a drawn end of the common cladding tube, in which the core rods are inserted, by connecting a glass block having the same diameter as the diameter of the common cladding tube to the drawn end before drawing of the optical fiber starts (see, for example, Japanese Unexamined Patent Application Publication No. 2006-160528).

SUMMARY OF THE INVENTION

An object of the present invention is to provide a method for producing a multicore optical fiber while reducing the mass of a glass block to be connected to a common cladding tube.

A production method for a multicore optical fiber according to the present invention includes in order a preform forming step, an insertion step, a heat shrinkage step, a sealing step, and a drawing step. In the preform forming step, a common cladding tube made of quartz glass and having a plurality of holes extending in an axial direction between a first end and a second end is formed. In the insertion step, core rods formed of quartz glass are inserted in the plurality of holes of the common cladding tube in a state in which end portions of the core rods are recessed from the first end. In the heat shrinkage step, a diameter of the first end is reduced by heating the first end. In the sealing step, the plurality of holes are sealed by connecting a glass block to the first end. In the drawing step, insides of the plurality of holes in the common cladding tube are depressurized from the second end, and spinning is performed from the first end while combining the common cladding tube and the core rods.

In the production method for the multicore optical fiber according to the present invention, a diameter-reducing step of tapering an outer peripheral portion of the common cladding tube within a fixed range from the first end to reduce a diameter of the outer peripheral portion may be included before or after the insertion step. In this case, after the diameter-reducing step, a thickness between a hole on an outermost periphery of the common cladding tube and the outer peripheral portion of the common cladding tube at the first end is preferably 10 mm or less. In the production method for the multicore optical fiber according to the present invention, a thickness between adjacent holes of the plurality of holes may be 10 mm or less.

In the production method for the multicore optical fiber according to the present invention, the glass block may have a base to be connected to the first end and an apex that is smaller than the base in an area of a cross section perpendicular to an axis of the common cladding tube. In this case, a mass of the glass block is preferably less than $2.63 \times r^3$ g when the base has a radius r cm. In addition, the glass block preferably has a height h cm more than or equal to $1.15r$ cm.

In the production method for the multicore optical fiber according to the present invention, before the drawing step starts, the glass block may be removed from the common cladding tube by melt-drawing while keeping the holes sealed at the first end.

According to the present invention, since the size and mass of the glass block connected to the common cladding tube can be reduced, the multicore optical fiber can be produced while preventing the glass block from falling.

DESCRIPTION OF THE PREFERRED EMBODIMENTS

Embodiments of the present invention will be described in detail below with reference to the attached drawings. The same elements will be denoted by the same reference signs in the description of the drawings, and redundant descriptions thereof are sometimes skipped. It should be noted that the present invention is by no means intended to be limited to these examples presented by way of illustration but is intended for inclusion of all changes within the meaning and scope of equivalence to the scope of claims, as described in the scope of claims.

Prior to fiber drawing of an optical fiber, an operation called "fiber pulling" is performed to drop a glass drop generated by heating a drawing starting end of an optical fiber preform. In the method described in Japanese Unexamined Patent Application Publication No. 2006-160528, when the number of cores disposed in the common cladding tube increases, the diameter of a glass block needed to seal a drawing starting end of the common cladding tube increases, and this also increases the mass (weight) of the glass block. For this reason, a phenomenon in which the glass block itself falls easily occurs. If the glass block itself falls, the operation is performed again. In the worst case, the operation is performed again from preparation of the common cladding tube, and this reduces the production efficiency of multicore optical fibers.

First Embodiment

Figure 1:
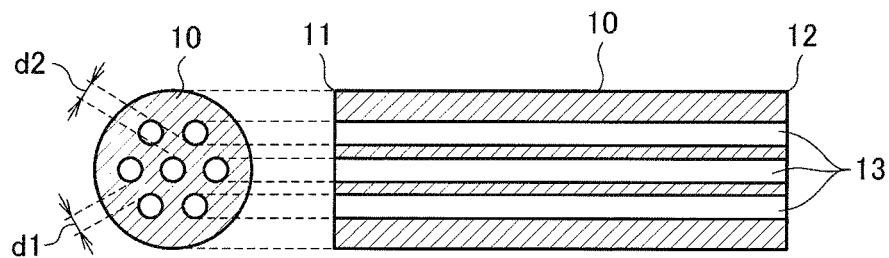
FIG. 1 illustrates a preform forming step in a production method for a multicore optical fiber according to a first embodiment of the present invention.

FIG. 1 illustrates a preform forming step in a production method for a multicore optical fiber according to a first embodiment. A left part of FIG. 1 is a front view of a common cladding tube 10, and a right part of FIG. 1 is a sectional side view of the common cladding tube 10. In production of a multicore optical fiber, a common cladding tube 10 is first formed in a preform forming step. The common cladding tube 10 is made of quartz glass, and has a plurality of holes 13 extending in the axial direction between a first end 11 and a second end 12. The term "axial direction" refers to a direction from the first end 11 to the second end 12 or a direction opposite therefrom. While the number of holes 13 is seven in the first embodiment, it may be an arbitrary natural number more than or equal to two. As a specific example of the number of holes 13, a double-digit natural number, such as 19 or 37, can also be given.

The thickness of the common cladding tube 10 between the adjacent holes 13 can be, for example, 10 mm or less. The thickness of the common cladding tube 10 may be the smallest between the holes 13 adjacent on the same circumference. Alternatively, the thickness of the common cladding tube 10 may be the smallest between the holes 13 adjacent on one radius. In the former case, a distance d1 is 10 mm or less. In the latter case, a distance d2 is 10 mm or less. By setting the thickness of the common cladding tube 10 between the adjacent holes 13 at 10 mm or less, more cores can be disposed in the common cladding tube 10 without changing the radius. Preferably, after the common cladding tube 10 is formed, inner wall surfaces of the holes 13 of the common cladding tube 10 are subjected to gas-phase etching, and the insides of the holes 13 are cleaned by a cleaning process that heats the common cladding tube 10 while passing a cleaning gas of chlorine or oxygen through the holes 13.

Figure 2:
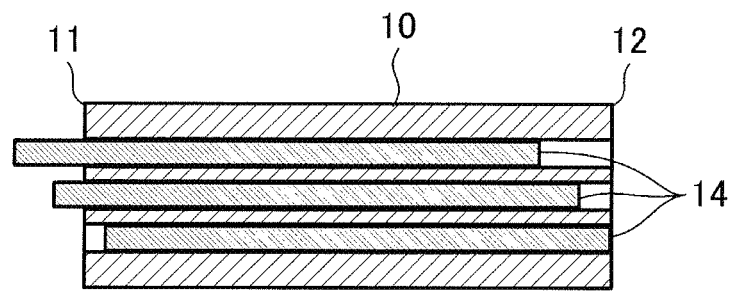
FIG. 2 illustrates an insertion step in the production method for the multicore optical fiber according to the first embodiment of the present invention.

FIG. 2 illustrates an insertion step in the production method for the multicore optical fiber according to the first embodiment of the present invention. Core rods 14 are made of quartz glass, and the outer diameter of the core rods 14 is slightly smaller than the diameter of the holes 13 in which the core rods 14 are to be inserted. The core rods 14 may be given the same outer diameter by making the diameters of the holes 13 the same. In this case, when the holes 13 and the core rods 14 are formed, trouble resulting from the difference in diameter can be reduced. Moreover, the light propagation characteristics of cores in multicore optical fibers to be produced can be made the same, and the performance of communication using the multicore optical fibers can be enhanced. The core rods 14 are inserted into the holes 13 from the first end 11 of the common cladding tube 10. Alternatively, the core rods 14 may be inserted into the holes 13 from the second end 12.

Figure 3A:
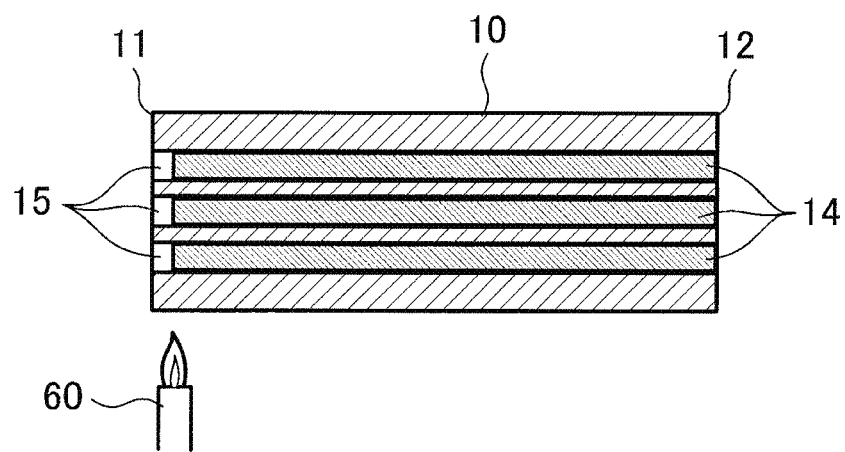
FIGS. 3A and 3B illustrate a heat shrinkage step in the production method for the multicore optical fiber according to the first embodiment of the present invention.
Figure 3B:
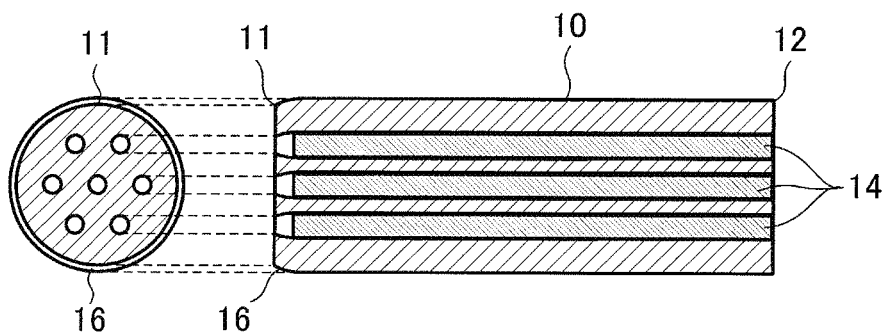

FIGS. 3A and 3B illustrate a heat shrinkage step in the production method for the multicore optical fiber according to the first embodiment of the present invention. In FIG. 3A, the core rods 14 are inserted in the holes 13 so that end portions of the core rods 14 are recessed from the first end 11. In the state in which the end portions of the core rods 14 are recessed from the first end 11, the first end 11 is heated. That is, FIG. 3A shows that the first end 11 of the common cladding tube 10 is heated with, for example, a burner 60 in a state in which the end portions of the core rods 14 located at the first end 11 are recessed from the first end 11 to form recesses 15.

FIG. 3B illustrates a state in which the diameter of the first end 11 of the common cladding tube 10 is reduced by heating the first end 11 (a left part of FIG. 3B is a front view and a right part of FIG. 3B is a sectional side view). As illustrated in FIG. 3A, when the burner 60 is placed near the first end 11 of the common cladding tube 10, at least the outer periphery of the first end 11 is heated. By heating, the quartz glass is melted, and the surface tension acts to reduce the surface area of the melted quartz glass. A portion 16 is shrunk, and the diameter of the first end 11 is reduced, as illustrated in FIG. 3B.

By setting the thickness of the common cladding tube 10 between the adjacent holes 13 to be small, for example, 10 mm or less, the temperature of the material of the common cladding tube 10 between the holes 13 at the first end 11 is easily increased, and the inner diameter of the holes 13 at the first end 11 can also be easily reduced, as illustrated in FIG. 3B. When the inner diameter of the holes 13 at the first end 11 is reduced in a short time, the core rods 14 at the first end 11 can be prevented from melting and closing the holes 13 by heating, and the holes 13 communicate between the recesses 15 to the second end 12. Thus, when depressurization is performed from the side of the second end 12, the recesses 15 can also be depressurized. Hence, formation of bubbles is suppressed, regardless of the presence of the recesses 15, and the quality of the multicore optical fiber to be produced can be improved.

Figure 4A:
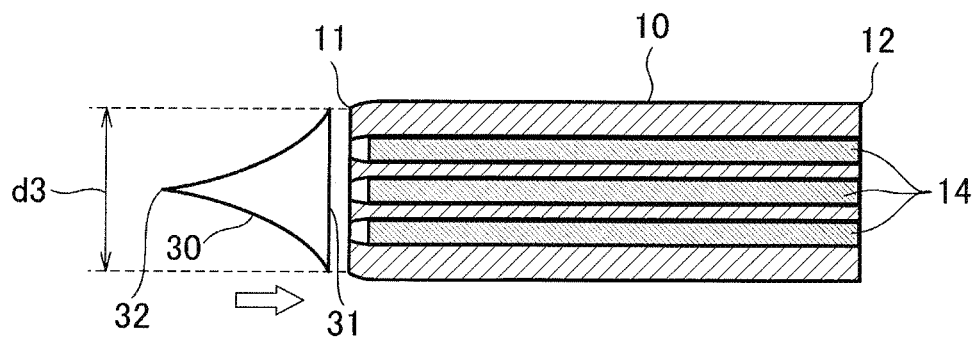
FIGS. 4A and 4B illustrate a sealing step in the production method for the multicore optical fiber according to the first embodiment of the present invention.
Figure 4B:
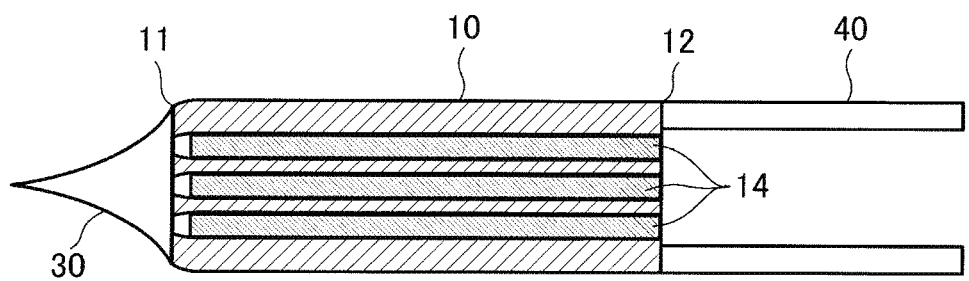

FIGS. 4A and 4B illustrate a sealing step in the production method for the multicore optical fiber according to the first embodiment of the present invention. In the sealing step, the plural holes 13 are sealed from the side of the first end 11 by connecting a glass block 30 to the first end 11. The above-described depressurization is enabled by sealing the holes 13.

To prevent the glass block 30 itself from falling in a drawing step to be described later, it is preferable to make the mass of the glass block 30 small. For this reason, in the shape of the glass block 30, a diameter d3 of a base 31 can be made smaller than the diameter of the common cladding tube 10 in the preform forming step in accordance with the diameter of the first end 11 of the common cladding tube 10 whose diameter is reduced by the heat shrinkage step.

To further reduce the mass of the glass block 30, the glass block 30 preferably has, not a cylindrical shape, such a shape that the diameter decreases with an increasing distance from the common cladding tube 10, and more preferably, has an apex 32 whose area of the cross section perpendicular to the axis of the common cladding tube 10 is smaller than that of the base 31. Since the glass block 30 has the apex 32, the mass of the glass block 30 can be reduced. A side surface of the glass block 30 between the base 31 and the apex 32 is concaved toward the inside of the glass block 30, when viewed from the outside of the glass block 30. In other words, it is preferable that the glass block 30 should be included inside a cone defined by the apex 32 and the base 31. By using such a shape of the glass block 30, the mass of the glass block 30 can be reduced further.

It is experimentally found that the preferred range of the distance between the base 31 and the apex 32 of the glass block 30 (height of the glass block 30) has a lower limit value in proportion to the radius of the base 31. According to the experiment, when a radius r of the base 31 is 3.5 cm, the lower limit value of a distance h of the glass block 30 is 4.0 cm to form a glass drop by heating before drawing. Therefore, the lower limit value of the preferred range of the height h is $(40/35) \times r = 1.15 \times r$ cm. When the glass block 30 is shaped like a right circular cone, the lower limit value of a mass M (unit: gram (g)) of the glass block 30 is as follows:

$$M = 2.2 \times (\pi r^2 \times h)/3 = 2.63 \times r^3.$$

The value 2.2 represents the glass density (unit: g/cm$^3$). Hence, when the glass block 30 is included inside the right circular cone, the mass M (unit: g) of the glass block 30 is preferably less than $2.63 \times r^3$. This can more reliably form a glass drop while reducing the mass of the glass block 30.

FIG. 4B is a sectional side view illustrating a state in which a handling tube 40 is connected to the second end 12. The thickness of a side wall of the handling tube 40 can be, for example, a thickness between the holes 13 on the outermost periphery of the common cladding tube 10 and the outer peripheral portion of the common cladding tube 10. By using such a thick handling tube 40, the side wall of the handling tube 40 does not close all of the holes 13, and the insides of the holes 13 can be depressurized through the handling tube 40. Connection of the handling tube 40 to the second end 12 may be performed before the insertion step. When the side wall of the handling tube 40 does not close all of the holes 13, an example of an upper limit value of the thickness of the side wall of the handling tube 40 is the sum of the diameter of the holes 13 and the thickness between the holes 13 on the outermost periphery of the common cladding tube 10 and the outer peripheral portion of the common cladding tube 10.

Figure 5A:
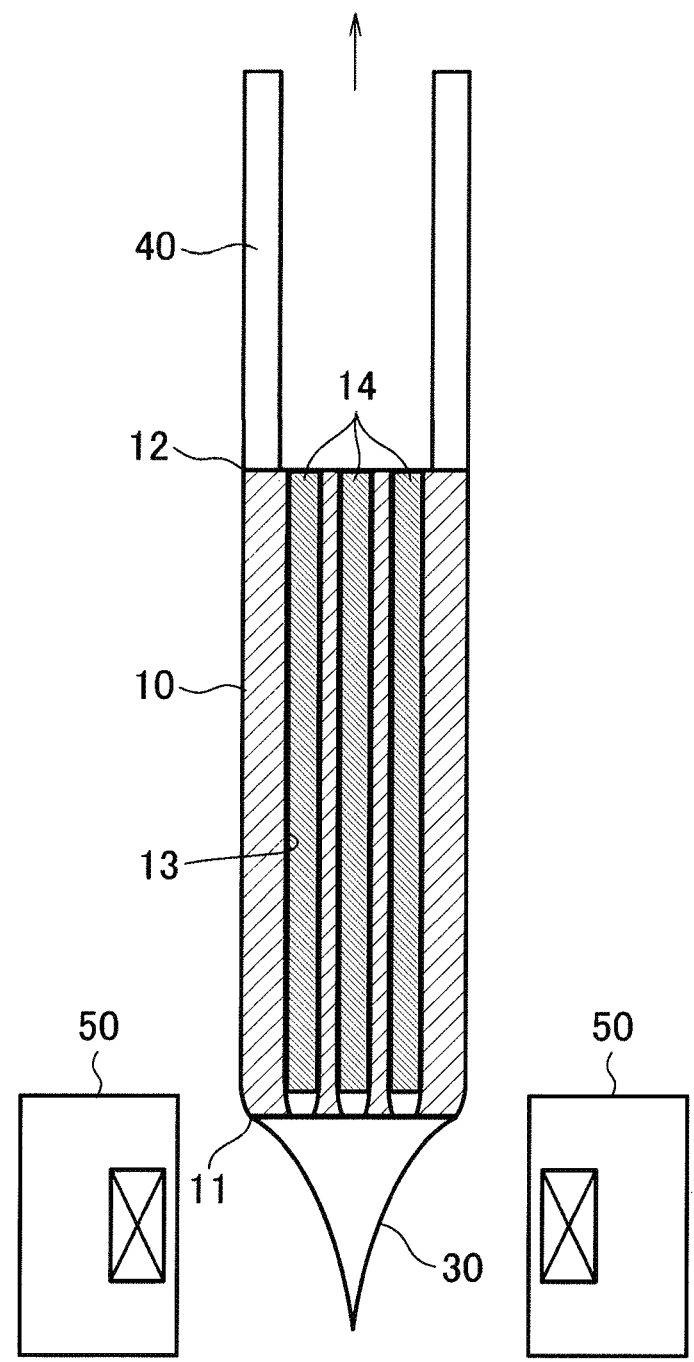
FIGS. 5A and 5B illustrate a drawing step in the production method for the multicore optical fiber according to the first embodiment of the present invention.
Figure 5B:
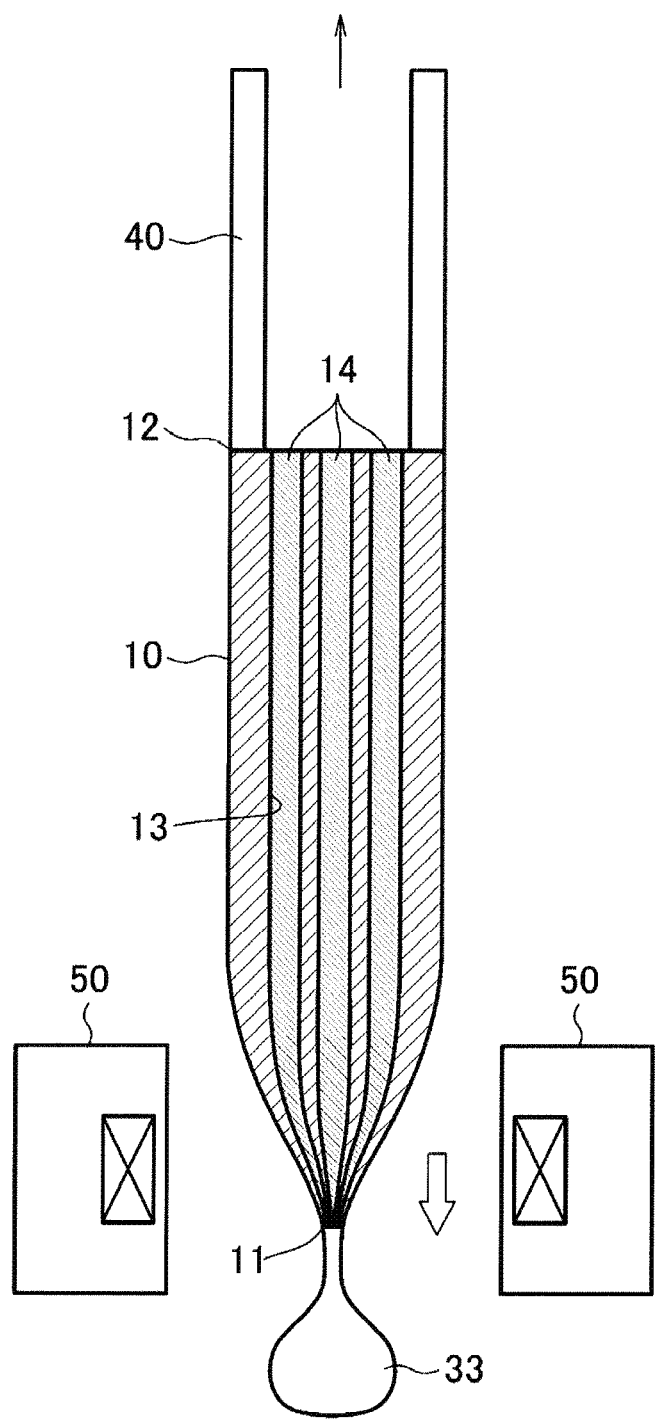

FIGS. 5A and 5B illustrate a drawing step in the production method for the multicore optical fiber according to the first embodiment of the present invention. FIG. 5A illustrates a state in which the common cladding tube 10 to which the handling tube 40 is connected is placed in an upright position with the glass block 30 facing down, the insides of the holes 13 in which the core rods 14 are inserted are depressurized from the handling tube 40, and the first end 11 of the common cladding tube 10 and the glass block 30 are put in a heating furnace 50. The glass block 30 is heated by the heating furnace 50, and a glass drop is formed and falls. Accordingly, in the drawing step, fiber pulling is performed by using a glass string continuing from the falling glass drop. After that, spinning is performed while combining the common cladding tube 10 and the core rods 14 from the first end 11, so that a multicore optical fiber is produced.

As illustrated in FIG. 5B, the first end 11 of the common cladding tube 10 and the glass block 30 are put in the heating furnace 50, and are melted thereby. Thus, the melted glass block 30 and first end 11 can be melt-drawn downward while keeping the holes 13 at the first end 11 sealed with the glass block 30. At this time, a lump portion 33 of the melt-drawn glass block 30 may be removed. For safer operation, it is preferable to repeat removal while melt-drawing the glass block 30 without forming such a lump portion 33. By thus removing the lump portion 33 of the melt-drawn glass block 30, the glass block 30 spun from the beginning of fiber pulling can be removed or the mass of the glass block 30 can be reduced. This can shorten the time required until spinning of the multicore optical fiber starts.

As described above, according to the first embodiment, the diameter of the first end 11 of the common cladding tube 10 can be reduced by introducing the heat shrinkage step. For this reason, the mass of the glass block 30 can be reduced by reducing the size of the base 31 of the glass block 30 that seals the first end 11. Reduction of the mass can prevent falling of the glass block 30, and deterioration of the production efficiency of the multicore optical fiber can be suppressed.

Second Embodiment

Figure 6:
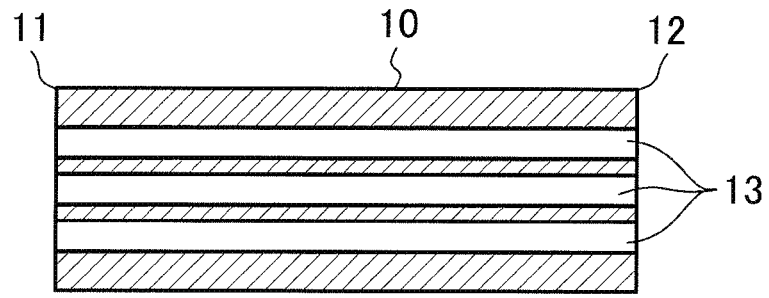
FIG. 6 illustrates a preform forming step in a production method for a multicore optical fiber according to a second embodiment of the present invention.

FIG. 6 illustrates a preform forming step in a production method for a multicore optical fiber according to a second embodiment, and is a sectional side view of a common cladding tube 10. To produce a multicore optical fiber, a common cladding tube 10 is first formed in a preform forming step. The common cladding tube 10 is made of quartz glass, and has a plurality of holes 13 extending in the axial direction between a first end 11 and a second end 12. While the total number of holes 13 provided inside the common cladding tube 10 is also seven in the second embodiment, it may be an arbitrary natural number of two or more.

The thickness of the common cladding tube 10 between the adjacent holes 13 can be, for example, 10 mm or less, similarly to the first embodiment. Preferably, after the common cladding tube 10 is formed, inner wall surfaces of the holes 13 are subjected to gas-phase etching, and the insides of the holes 13 are cleaned by a cleaning process that heats the common cladding tube 10 while passing a cleaning gas of chlorine or oxygen through the holes 13. This point is also similar to that of the first embodiment.

Figure 7:
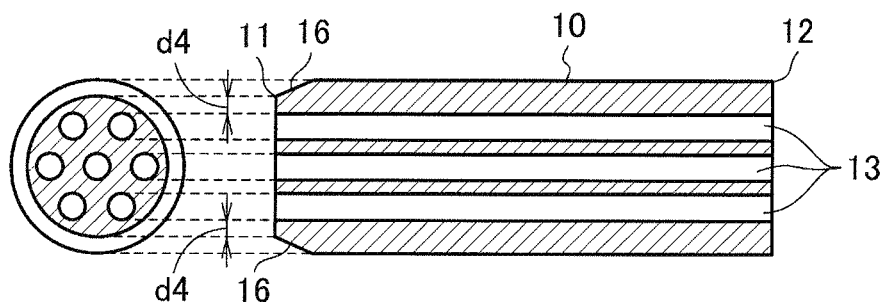
FIG. 7 illustrates a diameter-reducing step in the production method for the multicore optical fiber according to the second embodiment of the present invention.

FIG. 7 illustrates a state in which a part of an outer peripheral portion 16 of the common cladding tube 10 within a fixed range from the first end 11 is tapered and reduced in diameter by a diameter-reducing step after the preform forming step. Diameter reduction can be performed by either a mechanical method or a chemical method. Since a thickness d4 of the outer peripheral portion 16 at the first end 11 can be reduced by the diameter-reducing step, the diameter at the first end 11 can be made even smaller than that of the first embodiment by a heat shrinkage step to be performed later. Therefore, the diameter of a base of a glass block 30 and the mass of the glass block 30 can be further reduced.

In diameter reduction of the first end 11 by the diameter-reducing step, the thickness d4 of the common cladding tube 10 on the outermost periphery at the first end 11 is preferably 10 mm or less. By making the thickness 10 mm or less, reduction of the diameter of the first end 11 in the later heat shrinkage step can be increased. This can further reduce the size and mass of a glass block to be connected to the common cladding tube 10.

Figure 8:
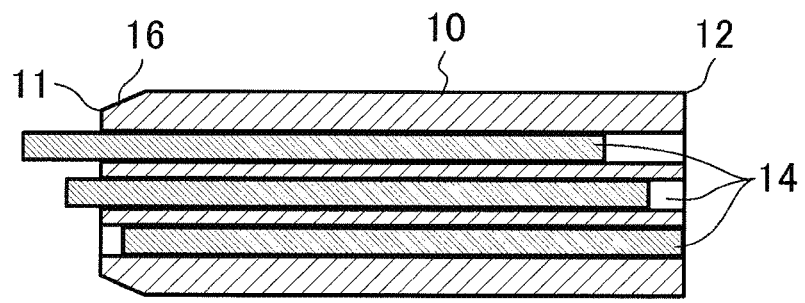
FIG. 8 illustrates an insertion step in the production method for the multicore optical fiber according to the second embodiment of the present invention.

FIG. 8 illustrates an insertion step in which core rods 14 are inserted in the plural holes 13 after the diameter-reducing step. Similarly to the first embodiment, the core rods 14 are made of quartz glass, and the outer diameter of the core rods 14 is slightly smaller than the diameter of the holes 13 in which the core rods 14 are to be inserted. The core rods 14 are inserted in the holes 13 from the first end 11 of the common cladding tube 10. Alternatively, the core rods 14 may be inserted in the holes 13 from the second end 12. While the diameter-reducing step is performed before the insertion step in the second embodiment, it can be performed after the insertion step, as required.

After that, similarly to the first embodiment, a heat shrinkage step and a sealing step are carried out, and a handling tube 40 is connected to the first end 11 of the common cladding tube 10. Then, the common cladding tube 10 is placed in an upright position with a glass block 30 facing down, the insides of the holes 13 in which the core rods 14 are inserted through the handling tube 40 are depressurized, and the first end 11 of the common cladding tube 10 and the glass block 30 are put into a heating furnace 50. Spinning is performed while combining the common cladding tube 10 and the core rods 14 from the side of the first end 11 in a drawing step, so that a multicore optical fiber is produced.

As described above, according to the second embodiment, since the diameter-reducing step is introduced, the diameter of the first end 11 of the common cladding tube 10 can be further reduced. For this reason, falling of the glass block 30 that seals the first end 11 can be prevented by reducing the mass of the glass block 30, and this can suppress deterioration of the production efficiency of the multicore optical fiber.

What is claimed is:

1. A production method for a multicore optical fiber comprising in order:
    a preform forming step of forming a common cladding tube made of quartz glass and having a plurality of holes extending in an axial direction between a first end and a second end;
    an insertion step of inserting core rods formed of quartz glass in the plurality of holes of the common cladding tube in a state in which end portions of the core rods are recessed from the first end;
    a heat shrinkage step of reducing a diameter of the first end by heating the first end,
    a sealing step of sealing the plurality of holes by connecting a glass block to the first end; and
    a drawing step of producing the multicore optical fiber by depressurizing insides of the plurality of holes in the common cladding tube from the second end and performing spinning from the first end while combining the common cladding tube and the core rods.

2. The production method for the multicore optical fiber according to claim 1, further comprising:
    a diameter-reducing step of tapering an outer peripheral portion of the common cladding tube within a fixed range from the first end to reduce a diameter of the outer peripheral portion before or after the insertion step.

3. The production method for the multicore optical fiber according to claim 2, wherein,
    after the diameter-reducing step, a thickness between a hole on an outermost periphery of the common cladding tube and the outer peripheral portion of the common cladding tube at the first end is 10 mm or less.

4. The production method for the multicore optical fiber according to claim 1, wherein
    a thickness between adjacent holes of the plurality of holes is 10 mm or less at the first end.

5. The production method for the multicore optical fiber according to claim 1, wherein
    the glass block has a base to be connected to the first end and an apex that is smaller than the base in an area of a cross section perpendicular to an axis of the common cladding tube.

6. The production method for the multicore optical fiber according to claim 5, wherein
    a mass of the glass block is less than $2.63 \times r^3$ g when the base has a radius r cm.

7. The production method for the multicore optical fiber according to claim 6, wherein
    the glass block has a height h cm more than or equal to 1.15r cm.

8. The production method for the multicore optical fiber according to claim 1, wherein,
    before the drawing step starts, the glass block is removed from the common cladding tube by melt-drawing while keeping the holes sealed at the first end.

* * * * *